(No Model.)

H. IKEN.
FLOWER POT.

No. 576,850. Patented Feb. 9, 1897.

Witnesses:

Inventor:
Heinrich Iken,
by Eustace W. Hopkins
Atty.

UNITED STATES PATENT OFFICE.

HEINRICH IKEN, OF GERRESHEIM, GERMANY.

FLOWER-POT.

SPECIFICATION forming part of Letters Patent No. 576,850, dated February 9, 1897.

Application filed March 26, 1896. Serial No. 584,980. (No model.)

*To all whom it may concern:*

Be it known that I, HEINRICH IKEN, a subject of the King of Prussia, German Emperor, and a resident of Gerresheim, in the Kingdom of Prussia, German Empire, have invented certain new and useful Improvements in Flower-Pots, of which the following is a full, clear, and exact description.

The present invention relates to flower-pots and the like made of sheet metal and finely perforated to render them porous; and in order to render the present specification more easily intelligible reference is had to the accompanying drawings, in which similar letters of reference denote similar parts throughout the several views.

Figure 1:
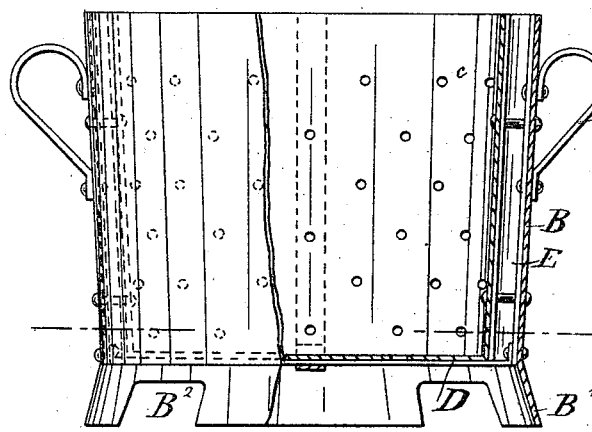
Figure 2:
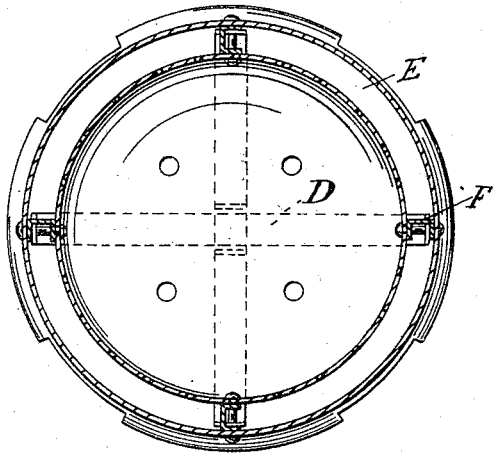

Figure 1 is a part vertical section and part side elevation of a large flower-pot constructed according to the present invention; Fig. 2, a horizontal section on line $xx$ of Fig. 1, and Fig. 3 a side elevation of a smaller kind of flower-pot.

Referring to Figs. 1 and 2, the device consists of an inner receptacle A, made of sheet metal and finely perforated all over, as at $c$. These perforations must be very fine, as otherwise the roots of the plants will grow through and render replanting of the same impossible, or at any rate dangerous to the health of the plant.

The inner receptacle A is mounted on a cross-piece D, secured in the outer receptacle B, said cross-piece being arranged some little distance from the ground, and the lower rim B' of the outer receptacle being cut away at parts, as shown at D. The inner part A is steadied in the outer part by means of U-iron rods F, secured to the sides by rivets or other suitable means. Thus an air-space is left at E all round the inner receptacle. The outer part need not be perforated and may be decorated in any suitable manner and provided with handles $b$.

Pots constructed in this manner are much cheaper than earthenware or wood pots or tubs and are capable of much more effective decoration. They are just as healthy for the plants as earthenware pots, because the porosity of the latter is effectually replaced by the fine perforations.

Figure 3:
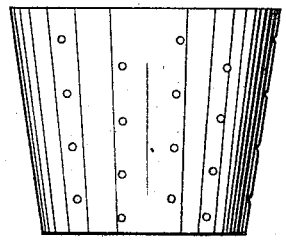

In Fig. 3 an ordinary small flower-pot made of sheet metal and provided with fine perforations is illustrated. The arrangement of the same is obvious from the drawings and needs no further explanation.

I claim as my invention—

The combination of an inner receptacle A having over its whole surface fine perforations, an outer plain receptacle B, a cross-piece D fixed therein near the bottom, recesses $B^2$ in the bottom rim of said outer receptacle and vertical U-irons F fixed between the two receptacles substantially as described and shown and for the purpose specified.

In witness whereof I have hereunto set my hand in presence of two witnesses.

HEINRICH IKEN.

Witnesses:
 REINHARD SHWOBE,
 WILLIAM ESSENWEIN.